US009623379B2

United States Patent
Lanz et al.

(10) Patent No.: US 9,623,379 B2
(45) Date of Patent: Apr. 18, 2017

(54) SPLICED FIBER-REINFORCED OUTER SHELL FOR CYLINDRICAL FILTRATION ELEMENT

(71) Applicant: Dow Global Technologies LLC, Midland, MI (US)

(72) Inventors: Thomas M. Lanz, Woodbury, MN (US); Allan D. Hammel, Grant, MN (US)

(73) Assignee: Dow Global Technologies LLC, Midland, MI (US)

(*) Notice: Subject to any disclaimer, the term of this patent is extended or adjusted under 35 U.S.C. 154(b) by 106 days.

(21) Appl. No.: 14/758,370

(22) PCT Filed: Feb. 28, 2014

(86) PCT No.: PCT/US2014/019180
§ 371 (c)(1),
(2) Date: Jun. 29, 2015

(87) PCT Pub. No.: WO2014/163950
PCT Pub. Date: Oct. 9, 2014

(65) Prior Publication Data
US 2015/0367287 A1     Dec. 24, 2015

Related U.S. Application Data

(60) Provisional application No. 61/778,522, filed on Mar. 13, 2013.

(51) Int. Cl.
*B65H 21/00* (2006.01)
*B01D 67/00* (2006.01)
(Continued)

(52) U.S. Cl.
CPC ........ *B01D 67/0002* (2013.01); *B01D 29/111* (2013.01); *B01D 35/30* (2013.01);
(Continued)

(58) Field of Classification Search
CPC .... B29C 2045/14557; B29C 45/14467; G02B 6/36; G02B 6/38; G02B 6/40
(Continued)

(56) References Cited

U.S. PATENT DOCUMENTS 6,977,314 B2    12/2005    Vandersall et al.
2005/0194317 A1*  9/2005   Ikeyama .............. B01D 35/143
                                                210/652
(Continued)

FOREIGN PATENT DOCUMENTS

JP    200821723     1/2008
JP    2009138858    6/2009
JP    2011236972    11/2011

OTHER PUBLICATIONS

Miyaura, et al., Palladium-Catalyzed Cross-Coupling Reactions of Organoboron Compounds, Chem. Rev. 1995, 95, 2457-2483.
(Continued)

*Primary Examiner* — Allison Fitzsimmons
(74) *Attorney, Agent, or Firm* — Edward W. Black

(57) ABSTRACT

A filtration element with a fiber-reinforced shell and a method for fabricating the same. The fabrication method including the steps of: i) coating a multi-strand fiber with a liquid resin, ii) winding the coated fiber about the cylindrical filtration element, and iii) solidifying the resin to form a fiber-reinforced shell. The method is characterized by utilizing a spliced fiber formed by: a) aligning an end of a first multi-strand fiber with an end of a second multi-stand fiber such that the aligned fibers extend along a common axis (X), b) wrapping a layer of a heat-shrinkable film about the outer diameter of the aligned ends of the fibers wherein heat-shrinkable film includes a layer of adhesive that contacts the overlapping strands of the fibers, and c) heating the film so that the film draws inward upon the aligned ends of each
(Continued)

fiber and forms an integral bond such that the effective cross-sectional area of a section of fiber.

6 Claims, 2 Drawing Sheets

(51) Int. Cl.
  *B01D 35/30* (2006.01)
  *B01D 29/11* (2006.01)
  *B01D 65/00* (2006.01)
  *B01D 69/04* (2006.01)
  *B01D 69/12* (2006.01)

(52) U.S. Cl.
  CPC .......... *B01D 35/308* (2013.01); *B01D 65/00* (2013.01); *B01D 69/04* (2013.01); *B01D 69/12* (2013.01); *B65H 21/00* (2013.01); *B01D 2313/20* (2013.01)

(58) Field of Classification Search
  USPC .......... 210/490, 767, 500.1, 500.21, 500.23, 210/500.26, 503, 506, 508; 385/95, 96, 385/97, 98, 99, 134, 135, 136, 137
  See application file for complete search history.

(56) References Cited

U.S. PATENT DOCUMENTS

| | | |
|---|---|---|
| 2009/0052846 A1* | 2/2009 | Miyamori ............ G02B 6/2558 385/96 |
| 2011/0124922 A1 | 5/2011 | Trejo et al. |
| 2012/0004466 A1 | 1/2012 | Martenak et al. |
| 2012/0004467 A1 | 1/2012 | Kramer et al. |
| 2012/0004468 A1 | 1/2012 | Tate et al. |
| 2012/0004469 A1 | 1/2012 | Martenak et al. |
| 2012/0321533 A1 | 12/2012 | Almqvist et al. |

OTHER PUBLICATIONS

Colacot, The 2010 Nobel Prize in Chemistry: Palladium-Catalysed Cross-Coupling, Platinum Metals Rev., 2011, 55, (2), 84-90.
Lyubimov, et al., Palladium-containing hypercorsslinked polystyrene as an easy to prepare catalyst for Suzuki reaction in water and organic solvents, Reactive & Functional Polymers 69 (2009) 755-758.
Leeke, et al., Continuous-Flow Suzuki-Miyaura Reaction in Supercritical Carbon Dioxide, Organic Process Research & Development 2007, 11, 144-148.
Reaxa Limited, Pd(II) EnCat, Encapsulated Palladium (II) Catalyst product data sheet.
Zhou, et al., Reusable, Polystrene-Resin-Supported, Palladium-Catalyzed, Atom-Efficient Cross-Coupling Reaction of Aryl Halides with Triarylbismuths, Eur. J. Org. Chem 2010, 416-419.

* cited by examiner

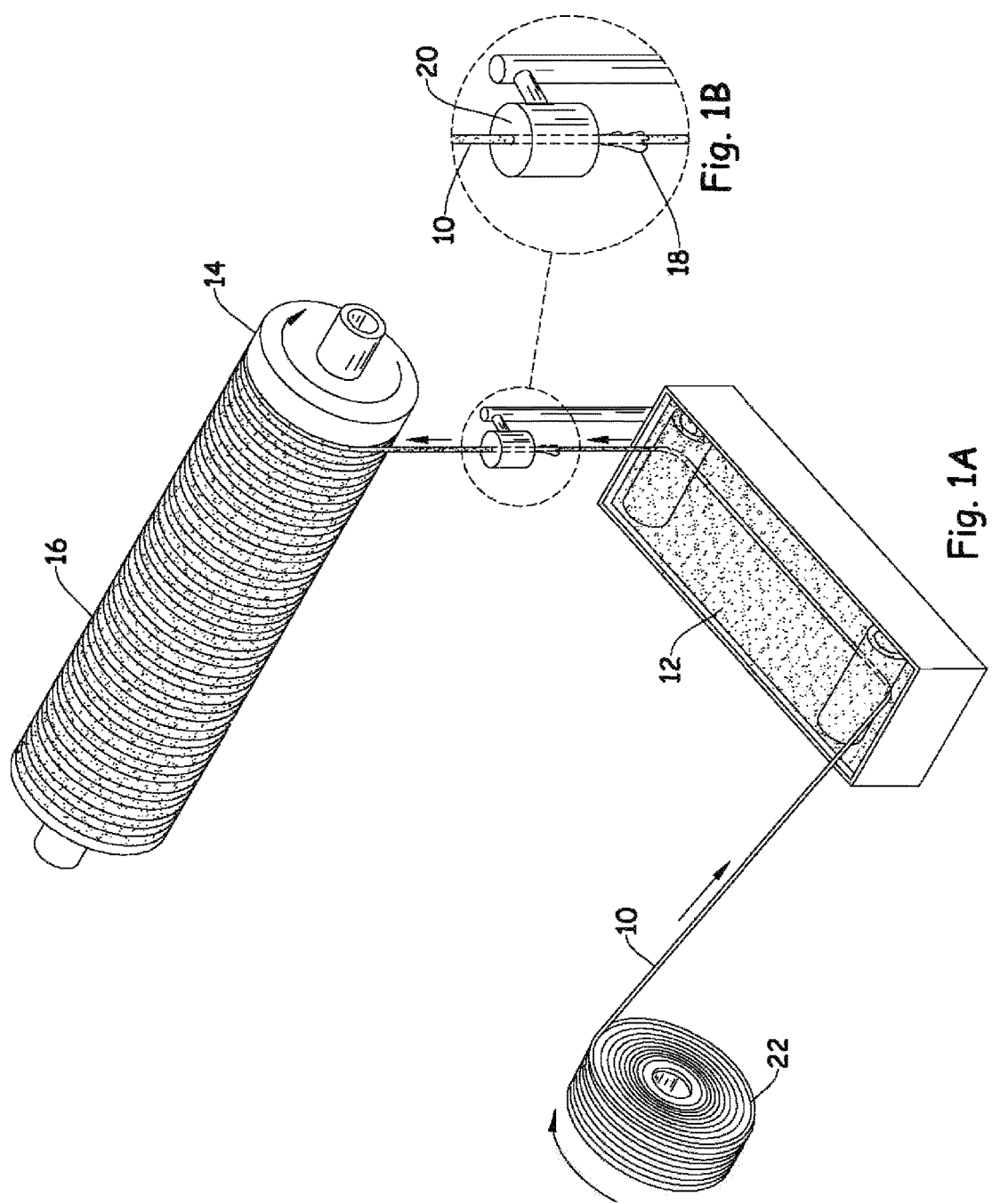

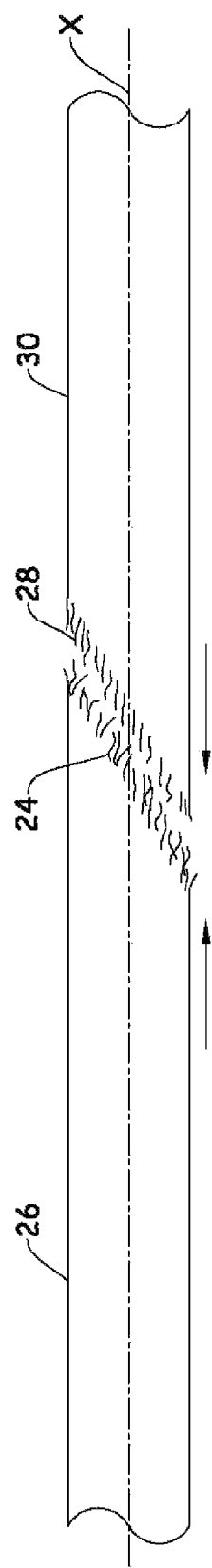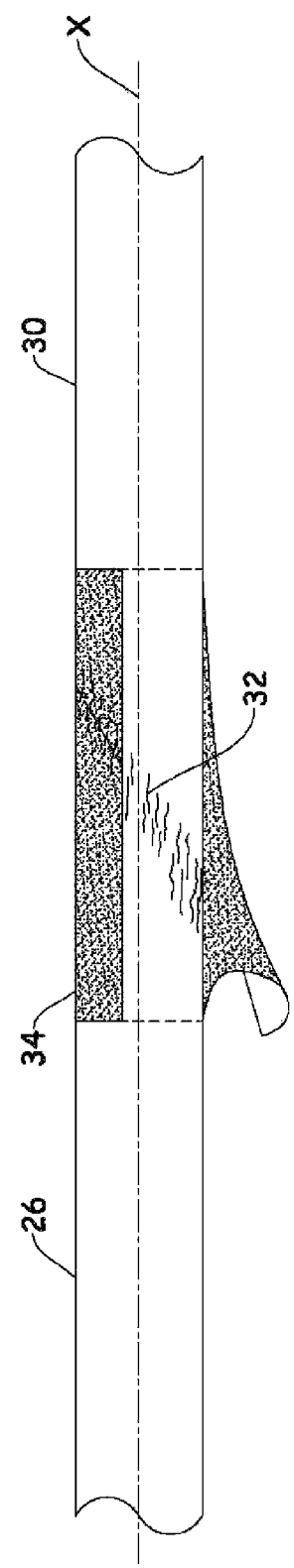

SPLICED FIBER-REINFORCED OUTER SHELL FOR CYLINDRICAL FILTRATION ELEMENT

FIELD

The invention is directed toward filtration elements including fiber-reinforced outer shells.

INTRODUCTION

Filtration elements are commonly provided in a cylindrical configuration with a rigid outer shell constructed from a fiber-reinforced composite material, e.g. fiberglass reinforced epoxy. The shell may be fabricated by winding a continuous fiber about the outer circumference of the filtration element. The fiber is coated with liquid resin (e.g. uncured epoxy resin) before, during or after the winding operation and the resin is subsequently solidified, e.g. cured, to form a rigid shell. Fiber is typically provided from a spool and must be regularly spliced with fiber from a replacement spool. A number of splicing techniques are known but they generally result in an enlarged union at the joined ends of fibers. While acceptable for many applications, enlarged unions are unacceptable for fabricating methods that require close tolerances. More specifically, conventional splicing techniques either produce too large of fiber unions, e.g. knots, shrink wrap tubing sleeves (see JP 2008-21723), or lack sufficient strength and flexibility (e.g. butt-end adhesive) to be suitable. Heat shrinkable tubing sleeves are particularly limited for use with stranded fibers as the ends of such fibers include a plurality of individual strands. These strands make insertion within a tubing sleeve extremely difficult, particularly within a large scale manufacturing environment.

SUMMARY

The present invention includes a filtration element with a fiber-reinforced shell and a method for fabricating the same. The fabrication method including the steps of: i) coating a multi-strand fiber with a liquid resin, ii) winding the coated fiber about the cylindrical filtration element, and iii) solidifying the resin to form a fiber-reinforced shell. The method is characterized by utilizing a spliced fiber formed by:
  a) aligning an end of a first multi-strand fiber with an end of a second multi-stand fiber such that the aligned fibers extend along a common axis (X),
  b) wrapping a layer of a heat-shrinkable film about the outer diameter of the aligned ends of the fibers wherein heat-shrinkable film includes a layer of adhesive that contacts the overlapping strands of the fibers, and
  c) heating the film so that the film draws inward upon the aligned ends of each fiber and forms an integral bond such that the effective cross-sectional area of a section of fiber.

BRIEF DESCRIPTION OF THE DRAWINGS

The figures are not to scale and include idealized views to facilitate description. Where possible, like numerals have been used throughout the figures and written description to designate the same or similar features.

FIG. 1 is schematic view of a fiber-reinforced shell being fabricated upon a cylindrical filtration element.

FIG. 2 is perspective view of two fiber ends being aligned along a common axis.

DETAILED DESCRIPTION

For purposes of the present invention, the type of filtration media within the filtration element is not particularly limited. The selection of filtration media will typically depend upon the specific application, feed source, solute, and foulants. Representative examples include membrane-based media such as composite flat sheet, hollow fiber and tubular membranes which may be used in a wide variety of applications including: reverse osmosis (RO), forward osmosis (FO) nanofiltration (NF), ultrafiltration (UF) and microfiltration (MF). Other media examples include granular, powder or particle form adsorbents, ion exchange and chelating resins. Spiral wound elements are one preferred type of filtration element. Such elements may be formed by winding one or more membrane envelopes and optional feed channel spacer sheet(s) ("feed spacers") about a permeate collection tube. Each membrane envelope preferably comprises two substantially rectangular membrane sheets surrounding a permeate channel spacer sheet ("permeate spacer"). This sandwich-type structure is secured together, e.g. by sealant, along three edges while the fourth edge abuts the permeate collection tube so that the permeate spacer is in fluid contact with openings passing through the permeate collection tube. The housing or "shell" is constructed a fiber reinforced plastic, e.g. long glass fibers coated with a thermoplastic or thermoset resin. During element fabrication, long glass fibers are wound about the partially constructed element and resin (e.g. liquid epoxy) is applied and hardened. The ends of elements are often fitted with an anti-telescoping device or end cap (not shown) designed to prevent membrane envelopes from shifting under the pressure differential between the inlet and outlet ends of the element. Examples of end cap designs including FilmTec Corp's iLEC™ interlocking end cap along with those described in U.S. 2011/0042294 and U.S. Pat. No. 6,632,356. Additional details regarding various components and construction of spiral wound elements are provided in the literature, see for example: U.S. Pat. No. 5,538,642 which describes a technique for attaching a permeate spacer to a permeate collection tube, U.S. Pat. No. 7,951,295 which describes trimming operations and the use of a UV adhesive for forming a insertion point seal, U.S. Pat. No. 7,875,177 which describes an applicable leaf packet and U.S. Pat. No. 5,096,584 which describes various embodiments, components and construction techniques particularly suited for gas separations. One preferred composite membrane sheet is FilmTec Corp's FT-30™ membrane which comprises a bottom layer (back side) of a nonwoven polyester material web (e.g. PET scrim), a middle layer of a microporous polymer such as polysulfone having a thickness of about 25-125 μm, and top layer (front side) comprising a thin film polyamide layer having a thickness less than about 1 micron and more commonly from about 0.010 to 0.1 micron. The polyamide layer is preferably created by an interfacial polycondensation reaction between a polyfunctional amine monomer and a polyfunctional acyl halide monomer upon the surface of the microporous polysulfone as described in: U.S. Pat. Nos. 4,277,344, 5,658,460 and 6,878,278.

In one embodiment the invention is a cylindrical filtration element including a fiber-reinforced shell wherein the shell comprises a fiber wound about the element and encased within a solidified resin. The fiber is a spliced fiber formed by joining an end of a first multi-strand fiber to an end of a second multi-strand fiber to form a single fiber having an effective cross-sectional area that varies by no more than 25% along its length. The term "effective" is used to describe the cross-sectional area of the fiber as the cross-sectional shape of the fiber is not necessarily circular, and may be somewhat dynamic given the ability of individual strands to move relative to one another. The spliced end includes an outer wrapping of a layer of a heat-shrinkable film.

In another embodiment, the invention includes a method for fabricating of a fiber-reinforced shell for a cylindrical filtration element. As illustrated in FIG. 1, the method involves the steps of: i) coating a multi-strand fiber (10) with a liquid resin (12), ii) winding the coated fiber about the cylindrical filtration element (14), and iii) solidifying the resin to form a fiber-reinforced shell (16). The multi-strand fiber (10) is not particularly limited but glass fibers are preferred. The selection of resin and fiber coating technique are not particularly limited. Applicable resins include thermoplastics and thermosets, e.g. epoxy resins. The technique for solidifying the liquid resin will depend upon the composition of the resin. Common techniques include heating, exposure to light or the elapse of time. For example, liquid epoxy resins may be selected based upon cure times that correspond to fabrication times such that delays (e.g. setting times) are avoided. One preferred fiber coating technique includes coating the multi-strand fiber with a liquid resin, such as by way of spraying, brushing or preferably dipping the fiber into a reservoir of the liquid resin. Excess resin (18) may be removed from the coated fiber by drawing the fiber through an orifice having a cross-sectional area between 1 and 25% greater than the largest cross-sectional area of the fiber. This step ensures that the fiber (10) is sufficiently coated while reducing the amount of excessive resin (18) drawn through the fabrication process. One challenge of the resin removal step is that the effective cross sectional area of the fiber cannot vary significantly (e.g. more than 25%) along its length. Otherwise, the fiber snags and potentially breaks or becomes damaged as it passes through the orifice. Once coated and after any excess resin is removed, the fiber is concentrically wound around the cylindrical filtration element, and resin is solidified (e.g. cured) to form a fiber-reinforced shell.

During the fabrication of the shell, fiber is provided from a spool (22). As the fiber reaches the end of the spool, it must be spliced with the end of a fiber on a new spool. The above mentioned requirement of fiber uniformity cannot be satisfied using convention fiber splicing techniques. Conventional splicing techniques either produce too large of fiber unions, e.g. knots, shrink wrap tubing sleeves, or lack sufficient strength and flexibility (e.g. butt-end adhesive connection) to be suitable. The present invention includes a new splicing technique that provides both adequate strength and fiber uniformity. More specifically, the spliced fiber of the present invention is formed by joining an end (24) of a first multi-strand fiber (26) to an end (28) of a second multi-strand fiber (30) to form a single fiber having an effective cross-sectional area that varies by no more than 25% along its length. The spicing method includes the step of aligning the ends (24, 28) of the first and second fiber (26, 30) along a common axis (X) (shown in FIG. 2). The step of aligning the ends of fibers preferably includes overlapping (32) (partially entangling) a plurality of the individual strands extending from the ends of the first and second fiber (26, 30). In order to increase the surface area of overlap (32), the ends (24, 28) of the fibers (26, 30) may be cut along an angle acute to the axis (X) and the ends can be aligned to form an approximately complementary angles with each other. In this way, many of the individual strands extending from the fiber ends overlap (32) with each other but do not create a union that has a cross-sectional area significantly larger (e.g. more than 25%) of the cross-sectional area of the individual fibers. A layer of a heat-shrinkable film (34) is then wrapped about the outer diameter of the aligned ends of the fibers. In order to maintain greater uniformity in the cross-sectional area of the joined fiber, the film is thin (e.g. less than 0.1 mm, more preferably less than 0.05 mm and still more preferably less than 0.04 mm). To further avoid adding bulk, the film is preferably wrapped about the aligned fiber ends such that the film has no more than minor overlap upon itself, i.e. less than 50% overlap (540°) and more preferably less than 25% or even 10% overlap. Once in place, the heat-shrinkable film (34) is heated so that the film draws inward upon the aligned ends (24, 28) of each fiber (26, 30) and forms an integral bond. To improve bonding, the film preferably includes a layer of adhesive that contacts the overlapping strands of the fibers. The adhesive is not particularly limited, e.g. the adhesive may be a contact adhesive, heat activated, etc. To further improve bonding while reducing the resulting cross-sectional area of the spliced fiber union, the film may be compressed about the aligned fiber ends during the heating step. Representative heat shrinkable films include Oracover UltraCote and Top Flight Monokote.

Many embodiments of the invention have been described and in some instances certain embodiments, selections, ranges, constituents, or other features have been characterized as being "preferred". Such designations of "preferred" features should in no way be interpreted as an essential or critical aspect of the invention. The entire content of each of the aforementioned patents and patent applications are incorporated herein by reference.

The invention claimed is:

1. A method for fabricating a fiber-reinforced outer shell for a cylindrical filtration element comprising the steps of: i) coating a multi-strand fiber with a liquid resin, ii) winding the coated fiber about the cylindrical filtration element, and iii) solidifying the resin to form a fiber-reinforced shell, wherein the fiber used in step i) comprises a spliced fiber formed by:
 a) aligning an end of a first multi-strand fiber with an end of a second multi-stand fiber such that the aligned fibers extend along a common axis (X),
 b) wrapping a layer of a heat-shrinkable film about the outer diameter of the aligned ends of the fibers wherein heat-shrinkable film includes a layer of adhesive that contacts the overlapping strands of the fibers, and
 c) heating the film so that the film draws inward upon the aligned ends of each fiber and forms an integral bond such that the effective cross-sectional area of a section of fiber varies by no more than 25% along its length.

2. The method of claim 1 wherein step (a) further includes overlapping individual strands of the first and second fiber with each other.

3. The method of claim 2 wherein step (a) further includes:
 i) cutting the ends of the first and second fiber along an angle acute to axis (X), and
 ii) aligning the ends of the first and second fiber to form complementary angles with each other.

4. The method of claim 1 further including the step of compressing the heat-shrinkable film about the aligned ends of each fiber during step (c).

5. The method of claim 4 wherein the adhesive is heat activated.

6. A cylindrical filtration element including a fiber-reinforced shell wherein the shell comprises a fiber wound about the element and encased within a solidified resin, and wherein the fiber comprises a spliced fiber formed by joining an end of a first multi-strand fiber to an end of a second multi-strand fiber to form a single fiber having an effective cross-sectional area that varies by no more than 25% along its length, and wherein the spliced end includes an outer wrapping of a single layer of a heat-shrinkable film.

* * * * *